United States Patent [19]

Howse

[11] Patent Number: 4,488,380

[45] Date of Patent: Dec. 18, 1984

[54] DOOR ARRANGEMENTS

[75] Inventor: Eric R. Howse, Christchurch, England

[73] Assignee: British Aerospace Public Limited Company, London, England

[21] Appl. No.: 447,938

[22] Filed: Dec. 8, 1982

[30] Foreign Application Priority Data

Dec. 10, 1981 [GB] United Kingdom ............... 8137364

[51] Int. Cl.³ .............................................. E05F 11/02
[52] U.S. Cl. ......................................... 49/279; 49/300
[58] Field of Search ................. 49/280, 279, 281, 300, 49/285

[56] References Cited

U.S. PATENT DOCUMENTS 1,545,170  7/1925  Schmitz ................................. 49/300
2,538,980  1/1951  Payne, Jr. ......................... 49/300 X

FOREIGN PATENT DOCUMENTS 76075  4/1919  Austria ................................. 49/279
527325  7/1921  France ................................. 49/279

Primary Examiner—Kenneth Downey
Attorney, Agent, or Firm—Cushman, Darby & Cushman

[57] ABSTRACT

A door and latch sequencing mechanism includes a door member 10 hingedly mounted along one edge to an aperture defined by body walls 12, for movement between open and closed positions. The door member 10 pivotally carries a latch 13 for movement between latched and unlatched positions. A crank member 16 turnable about a fixed axis is connected by a first connecting rod 18 to the door member and by a contracting linkage 19, 20, 21 to the latch member. The first connecting rod, contracting linkage and crank member are arranged so that turning of the crank member in the appropriate single sense sequentially (a) maintains the door member in its closed position or moves it to a temporary position remote from the open position,
(b) unlatches the latch, and
(c) opens the door member.

6 Claims, 1 Drawing Figure

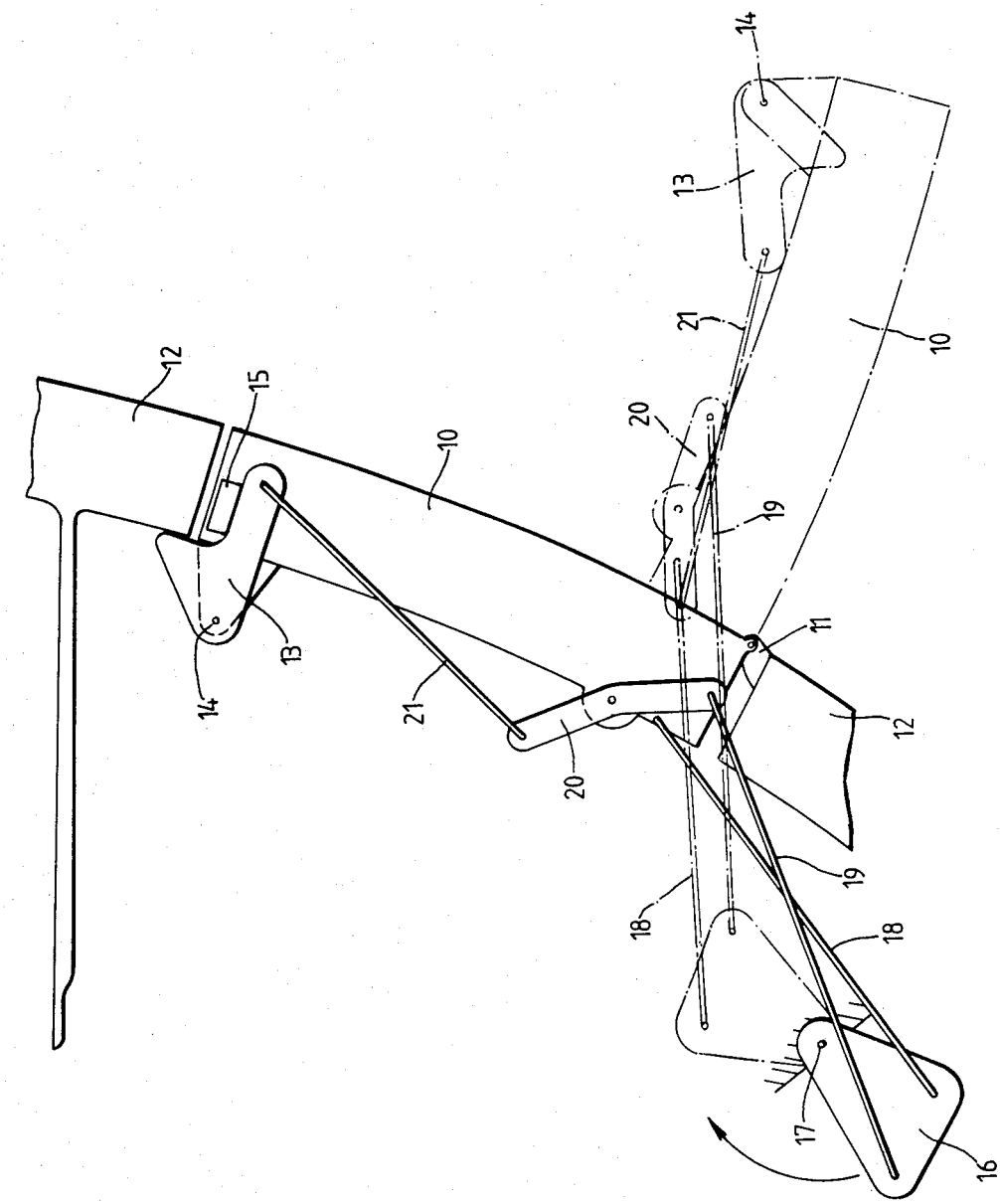

DOOR ARRANGEMENTS

This invention relates to arrangements for opening, closing and locking doors such as personnel and cargo doors, access panels etc., and in particular to such arrangements for use where substantial pressure differentials exist across the door.

In aircraft applications, where a door is to withstand substantial pressure differentials, a plug type design is commonly used, that is at least two opposed edges of the door are in sealing abutment with the surrounding structural frame and pressure loads are reacted through the abutments. However, due to limitations of available stowage space, it is often necessary to open the door outwards but this may be complicated to achieve since the door may be of greater cross-sectional area than its associated aperture to allow for structural abutment. This has previously been overcome by various solutions including tilting, twisting or folding of the door.

According to one aspect of this invention, there is provided a door and latch sequencing mechanism which comprises a door member hinged for hinging movement between an open and a closed position, latch means carried by the door member and movable between a latched position in which it latches the door member in the closed position and an unlatched position, a crank member mounted for turning movement about a fixed axis, first connecting rod means connecting the crank member to the door member for effecting opening and closing thereof, and second connecting rod means connecting the crank member to the latch means for effecting latching and unlatching thereof, the mechanism being arranged so that when the door is latched in its closed position, an opening force on the door member is effective to hold the latch means in its latched position, but that turning movement of the crank member in an appropriate single sense sequentially (a) maintains the door member in its closed position or moves it about its hinge from the closed position to a temporary position remote from the open position, (b) moves the latch means from the latched to the unlatched position, (c) moves the door about its hinge from the closed position or temporary position (as the case may be) toward the open position.

Preferably, the first connecting rod means is in the form of a single link pivoted at its ends to the door member and the crank member, respectively. In this case, when the door member is in the closed and latched position, the disposition of the link is such that it, in general, merely swings about its door pivot end as the crank member is initially appropriately turned, thus providing sequential features (a) above.

Preferably, and additionally, the second connecting rod means is in the form of a contracting linkage pivoted at its ends to the latch means and to the crank member, respectively. In this case when the door member is closed and latched, the disposition of the linkage is such that it is contracted to withdraw the latch to the unlatched position as the crank member is appropriately turned, thus providing sequential feature (b) above.

Sequential feature (c) is provided as further appropriate turning of the crank member is effected.

By way of example only, one specific embodiment of door and latch sequencing mechanism constructed in accordance with this invention will now be described in detail, reference being made to the accompanying drawing which is a side view of a door arrangement for use in an aircraft body.

In the arrangement illustrated, a substantial pressure difference may exist across the door when the aircraft body is pressurised and this pressure difference will tend to urge the door outwardly.

The door arrangement comprises a door member 10 hinged at its lower edge by hinge 11 to the aircraft body 12 for movement between a closed position (shown in full lines) and an outwardly open position (shown in dotted lines).

A latch member 13 is pivotally attached by latch pivot 14 to the upper edge of the door member 10 for movement between a latched position and an unlatched position. Movement of the latch member 13 beyond the latched position is prevented by means of an abutment 15 upstanding from the end of the door member 10.

A crank member 16 is pivotally attached to a fixed structural part of the aircraft body 12 by means of crank pivot 17 and drive means (not shown) are provided to effect turning movement of the crank member about pivot 17. The drive means may take the form of a hydraulic ram actuator disposed between the crank member and the aircraft body.

A first connecting rod 18 pivotally connects the crank member 16 to the door member 10. Second connecting linkage means comprising a link 19, a rocker arm 20, and a further link 21 pivotally connect the crank member 16 to the latch member 13, to enable movement of crank member 16 to effect movement of the latch member. Link 19 is pivotally connected at one end to the crank member 16 and at its other end to one end of rocker arm 20. The rocker arm 20 is pivotally mounted intermediate its ends on the door member 10 and is pivotally connected at its other end to one end of further link 21, the other end of the further link being pivotally connected to the latch member. Movement of the crank member therefore causes expansion and contraction of the effective length of the second connecting linkage means.

Referring now specifically to the closed position (shown in full lines) when the door member 10 is closed and the latch member 13 is in a latched position, the arrangement is such that the first connecting rod 18 is substantially in advance of a bottom dead-centre position with respect to the intended movement of crank member 16—that is to say only after angular movement of the crank member 16 will the first connecting rod be coincident with the crank pivot axis. In the case of link 19, however, when the door member is in a closed position, the link 19 is positioned near a bottom dead-centre position.

On operation of the mechanism to move the door member 10 from a closed position to an open position, the crank member is driven clockwise. This causes the first connecting rod 18 initially to draw the door member anticlockwise, until the connecting rod is in a dead-centre position whereupon the door member dwells in a position inwardly of the aircraft body. As this occurs, or soon thereafter, the crank member causes the second connecting linkage means to contract, thus withdrawing the latch member 13 from its latched position. Subsequent clockwise movement of the crank member then pushes the door in a clockwise sense via first connecting rod 18 to the open position shown in dotted lines.

In order to close the door member 10, the crank member is driven in a counter-clockwise sense and the above steps are reversed.

When the door member is fully closed, a pressure differential acting to urge the door outwardly would tend to urge the latch member 13 counter clockwise. This movement is however positively prevented by abutment 15. Moreover, the second connecting linkage means also resists counter clockwise movement of the latch member.

In a typical application, a door member will be hinged adjacent its lower edge to the aircraft body by means of a series of hinges or a single piano hinge. The above arrangement will be located adjacent a side of the door member and the driven latch member will be located at the upper edge of the door member. Further latch members will be provided along the upper edge of the door member and will be interconnected to the driven latch member by means of a torque tube. The number of further latches will be a function of the length of the door member.

I claim:

1. A door and latch sequencing mechanism which includes a door member hinged for hinging movement between an open and a closed position, latch means carried by said door member and movable between a latched position in which it latches the door member in the closed position and an unlatched position, a crank member mounted for turning movement about a fixed axis, first connecting rod means connecting the crank member to the door for effecting opening and closing thereof, second connecting rod means connecting the crank member to the latch means for effecting latching and unlatching thereof, the mechanism being arranged so that when the door is latched in its closed position, said first connecting rod means is in a before dead center position with respect to opening movement of the crank member and said second connecting rod means is between a position including said rod means being before a dead center position and a position wherein said rod means is at a dead center position with respect to said crank member, whereby an opening force on the door member is effective to hold the latch means in its latched position, but that turning movement of the crank member in an appropriate single sense sequentially (a) moves the door member about its hinge from the closed position to a temporary position remote from the open position,
(b) moves the latch means from the latched to the unlatched position,
(c) moves the door about its hinge from the temporary position toward the open position.

2. A door and latch sequencing mechanism as claimed in claim 1, wherein the first connecting rod means is in the form of a single link pivoted at its ends to the door member and the crank member respectively.

3. A door and latch sequencing mechanism according to claim 2, wherein said single link is arranged with respect to the door member and the crank member so that, when the door member is in its closed position, initial turning movement of said crank member in said appropriate sense causes said single link merely to pivot about its mounting on the door member with no or little longitudinal movement thereof, whereby said door member is maintained in its closed position or is moved from the closed position to said temporary position respectively.

4. A door and latch sequencing mechanism according to claim 1, wherein the second connecting rod means is in the form of a contracting linkage, one end of which is attached to the latch means and the other end of which is attached to the crank member.

5. A door and latch sequencing mechanism according to claim 4, wherein said contracting linkage includes rocker arm means pivotally mounted intermediate its ends on said door member, pivotally carrying adjacent one end link means for connection to said latch means and pivotally carrying adjacent its other end link means for connection to said crank member.

6. A door and latch sequencing mechanism according to claim 1, wherein said latch means is in the form of a latch member pivoted for movement between a latched and unlatched position, and an abutment member secured to said door member arranged so that when the door member is latched in its closed position, the latch member abuts the abutment member and an opening force on the door member urges the latch against the abutment member.

* * * * *